No. 642,608. Patented Feb. 6, 1900.
R. C. HILTON.
VALVE FOR INFLATION.
(Application filed Nov. 27, 1899.)
(No Model.)
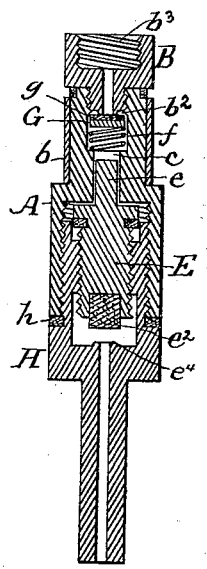
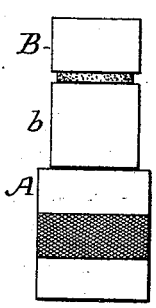
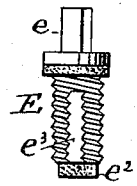
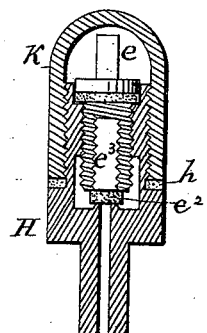
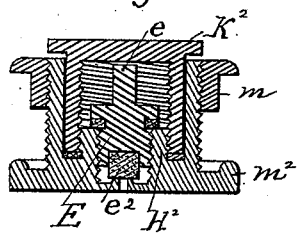
WITNESSES
E. W. Hart
J. J. Masson
INVENTOR
Roland C. Hilton
by E. E. Masson, Attorney

UNITED STATES PATENT OFFICE.

ROLAND C. HILTON, OF NEW BEDFORD, MASSACHUSETTS, ASSIGNOR OF ONE-HALF TO FREDERICK L. SOWLE, OF SAME PLACE.

VALVE FOR INFLATION.

SPECIFICATION forming part of Letters Patent No. 642,608, dated February 6, 1900.

Application filed November 27, 1899. Serial No. 738,333. (No model.)

*To all whom it may concern:*

Be it known that I, ROLAND C. HILTON, a citizen of the United States, residing at New Bedford, in the county of Bristol and State of Massachusetts, have invented certain new and useful Improvements in Valves for Inflation, of which the following is a specification, reference being had therein to the accompanying drawings.

This invention has for its object the production of simple, reliable, and inexpensive devices to facilitate the inflation of articles, particularly pneumatic tires, the devices consisting principally of two parts, one being secured to the object to be inflated and the other a valve carrier and controller adapted to be permanently secured either to the first part or to the inflator.

This invention consists, mainly, in the peculiar means employed to adapt the second or outer part to open or to tightly close the valve of the first or inner part of the device when desired, as shown in the accompanying drawings, in which—

Figure 1 represents, on an enlarged scale, a longitudinal central section of the outer and inner parts of the device coupled together as during the process of inflation. Fig. 2 is a side view of the outer part of the device constituting the controlling-key for the valve of the inner part. Fig. 3 is a side view of the plug carrying the lower valve. Fig. 4 is a longitudinal section of the inner part of the device with its valve closed and capped. Fig. 5 is a longitudinal section of the inner part of a modification of the device made shorter, adapted to be secured to the side of a pneumatic tire, showing its valve closed and capped.

In said drawings, A represents the tubular casing of the outer part of the device, having the upper end of its periphery provided with a rotatable sleeve $b$, adapted to be received and retained within one end of a rubber hose leading to an air-pump.

The outer end of the casing A has screwed part way in its interior a hollow plug B, the lower end of which has a valve-seat $b^2$. The upper portion of the plug B is of larger diameter and forms a shoulder to prevent the escape of the sleeve $b$. The upper portion of the plug B is screw-tapped internally at $b^3$ to receive, if desired, the screw-threaded nozzle of an ordinary inflation-pump.

The interior surface of the lower portion of the casing A is screw-tapped, and above said portion said interior is of much smaller size and has a central perforation $c$ of polygonal form, preferably square, to receive, guide, and control, as a watch-key, the corresponding square head $e$ of a valve-carrying plug E, located within the inner part of the device. The lower end of the plug E is chambered and contains a yielding washer $e^2$, of leather or of rubber, to rest upon the valve-seat $e^4$.

At the upper end of the square perforation $c$ the interior of the casing A is of larger diameter than said perforation to provide a shoulder upon which rests the lower end of a light coiled spring $f$. The upper end of said spring presses against the bottom of a valve G. The upper end of said valve carries a washer $g$, of yielding material, as leather or rubber, to bear against the valve-seat $b^2$, formed within the upper end of casing A and normally closes the opening.

The inner part of the device consists of a tube H, the upper end of which is screw-threaded externally with a right-hand thread to enter into engagement with the screw-tapped interior of the casing A, and the interior of the said tube H is screw-tapped with a left-hand thread to receive the left-hand thread of the plug E, so that the outer part having the casing A is placed and rotated into engagement with the right-hand screw-thread of the inner part H, and its square perforation $c$ engages the square head of the plug E and rotates it toward the right; but said plug having a left-hand thread causes it to be partly lifted and unscrewed from the tube H and lifts its washer $e^2$ from contact with the valve-seat in the bottom of said tube, opening the device for the passage of air from the air-pump. A similar result would be obtained if the interior of the casing had a left-hand thread and the plug E had a right-hand thread, being only a reversal of location of the right-hand and left-hand threaded parts. A segment of the periphery of the plug E is cut away to form a groove $e^3$ for the passage of air, and air can also pass between the walls of the perforation c and the square head of the plug.

When the part A is removed from the part H, a cap may be connected with said part H, with the washer h between the lower end of the said cap and a shoulder on the part H.

The short valve-tube $H^2$ (shown in Fig. 5) has tire-clamping flanges $m\ m^2$ and is adapted to receive and retain the lower end of the casing A after its cap $K^2$ has been removed and have its plug E, controlled by the square opening c, within said casing A.

Having now fully described my invention, I claim—

1. In a valve for inflation the combination of a tube having a valve-seat therein with a casing engaging said tube, a screw-valve in said tube having an angular stem engaging in an angular perforation in said casing, a plug connected with the outer end of said casing, and a valve within said casing adapted to be seated on the inner end of said plug substantially as described.

2. The combination of the cylindrical casing A, internally screw-threaded, a plug B, having its upper end screw-tapped internally and secured to said casing and having a valve-seat within its lower end, said casing having centrally a perforation and a shoulder above said perforation, a coiled spring having one end resting upon said shoulder and a valve resting upon said spring and bearing against the valve-seat of the upper plug B, substantially as described.

3. The combination of the tube H, having externally a screw-thread inclined in one direction, and internally a screw-thread inclined in the opposite direction, said tube having a valve-seat in its lower end, with a valve E, screw-threaded to fit the interior screw-thread and having a polygonal head, adapted to be received in and rotated by the casing A, substantially as described.

In testimony whereof I affix my signature in presence of two witnesses.

ROLAND C. HILTON.

Witnesses:
CLIFFORD P. SHERMAN,
FREDERICK L. SOWLE.